United States Patent
Chen et al.

(10) Patent No.: US 8,855,053 B2
(45) Date of Patent: Oct. 7, 2014

(54) SOUNDING MECHANISM AND CONFIGURATION UNDER CARRIER AGGREGATION

(75) Inventors: Yih-Shen Chen, Hsinchu (TW); Chih-Yuan Lin, Wujie Township, Yilan County (TW)

(73) Assignee: Mediatek Inc. (TW)

( * ) Notice: Subject to any disclaimer, the term of this patent is extended or adjusted under 35 U.S.C. 154(b) by 118 days.

(21) Appl. No.: 13/373,071

(22) Filed: Nov. 1, 2011

(65) Prior Publication Data

US 2012/0044906 A1 Feb. 23, 2012

Related U.S. Application Data

(63) Continuation-in-part of application No. 13/134,811, filed on Jun. 17, 2011.

(60) Provisional application No. 61/356,077, filed on Jun. 18, 2010, provisional application No. 61/409,733, filed on Nov. 3, 2010.

(51) Int. Cl.
*H04W 4/00* (2009.01)
*H04L 5/00* (2006.01)
*H04W 72/14* (2009.01)

(52) U.S. Cl.
CPC ........... *H04L 5/0051* (2013.01); *H04L 5/0053* (2013.01); *H04L 5/001* (2013.01); *H04W 72/14* (2013.01); *H04L 5/0091* (2013.01); *H04L 5/0023* (2013.01)
USPC .......................... 370/328; 370/468; 370/437

(58) Field of Classification Search
None
See application file for complete search history.

(56) References Cited

U.S. PATENT DOCUMENTS

| | | | |
|---|---|---|---|
| 2009/0181687 A1 | 7/2009 | Tiirola et al. | 455/450 |
| 2009/0262856 A1 | 10/2009 | Onggosanusi et al. | 375/267 |
| 2009/0274076 A1 | 11/2009 | Muharemovic et al. | 370/280 |
| 2010/0080187 A1 | 4/2010 | Papasakellariou et al. | 370/329 |

(Continued)

FOREIGN PATENT DOCUMENTS

| | | |
|---|---|---|
| CN | 101594683 A | 12/2009 |
| CN | 101765134 A | 6/2010 |

(Continued)

OTHER PUBLICATIONS

International Search Report and Written Opinion of International Search Authority for PCT/CN2011/081753 dated Feb. 16, 2012 (10 pages).

(Continued)

*Primary Examiner* — Bob Phunkulh
(74) *Attorney, Agent, or Firm* — Zheng Jin

(57) ABSTRACT

A method of multi-set RRC signaling for ap-SRS configuration is provided to enhance ap-SRS flexibility. An eNB transmits a plurality of sets of UE-specific SRS parameters to a UE via upper layer messaging in a multi-carrier wireless communication system. The eNB also determines triggering information of a selected set of UE-specific SRS parameters and an indicated carrier for the UE. The eNB then transmits an uplink or downlink grant over a primary carrier, the grant comprises triggering information for the UE to send an ap-SRS over the indicated carrier using the selected set of UE-specific SRS parameters. In one embodiment of joint signaling, the plurality of sets of UE-specific SRS parameters are signaled together in a single RRC transmission. In another embodiment of separate signaling, each set of UE-specific SRS parameters is signaled independently.

10 Claims, 6 Drawing Sheets

(56) References Cited

U.S. PATENT DOCUMENTS

| | | | | |
|---|---|---|---|---|
| 2010/0172235 | A1* | 7/2010 | Liu et al. | 370/208 |
| 2010/0246561 | A1 | 9/2010 | Shin et al. | 370/345 |
| 2011/0280220 | A1* | 11/2011 | Jia et al. | 370/335 |
| 2012/0002746 | A1* | 1/2012 | Pham | 375/295 |
| 2012/0069812 | A1* | 3/2012 | Noh et al. | 370/329 |
| 2012/0093119 | A1 | 4/2012 | Kim et al. | 370/329 |
| 2012/0182957 | A1 | 7/2012 | Noh et al. | 370/329 |
| 2012/0224557 | A1 | 9/2012 | Noh et al. | 370/329 |
| 2012/0252474 | A1* | 10/2012 | Tiirola et al. | 455/450 |
| 2012/0300740 | A1* | 11/2012 | Iwai et al. | 370/329 |
| 2013/0163571 | A1* | 6/2013 | Ouchi et al. | 370/336 |

FOREIGN PATENT DOCUMENTS

| | | |
|---|---|---|
| JP | 2012521173 | 3/2009 |
| JP | 2012538779 A | 3/2013 |
| WO | WO2010110526 A1 | 9/2010 |
| WO | WO2012059064 A1 | 5/2012 |

OTHER PUBLICATIONS

SIPO, the First Examination Opinion of Chinese patent application 201180001949.8, dated Jun. 4, 2013. (6 pages).

USPTO has prepared an Office Action for related U.S. Appl. No. 13/134,811 dated Dec. 23, 2013 (31 pages).

R1-103156; Motorola, CMCC; Aperiodic SRS Design for LTE-A; 3GPP TSG RAN1#61; May 10-14, 2010; Montreal, Canada (2 pages).

R1-101940; Huawei; CQI/PMI/RI Reporting for Carrier Aggregation; 3GPP TSG RAN WG1 Meeting #60bis; Apr. 12-16, 2010; Beijing, China (5 pages).

R1-100133; Samsung; Configuring SRS Transmissions in Re1.10; 3GPP TSG RAN WG1 #59bis; Jan. 19-23, 2010; Valencia, Spain (3 pages).

R1-105634; Motorola; on Triggering of Dynamic Aperiodic Sounding; 3GPP TSG RAN WG1 Meeting #62bis; Oct. 11-15, 2010; Xi'an, China (3 pages).

R1-103486, 3GPP TSG RAN WG1 Meeting #61bis, CATT, On Aperiodic SRS Transmission in LTE-A, Dresden, Germany, Jun. 28-Jul. 2, 2010 (4 pages).

R1-102114, 3GPP TSG RAN1 #60bis, Motorola, Aperiodic SRS for LTE-A, Beijing, China, Apr. 12-16, 2010 (2 pages).

JP Office Action for JP patent application 2013-514545 dated Dec. 17, 2013 (4 pages).

R1-100643 3GPP TSG RAN WG1 Meeting #59bis, LG Electronics, Blind Decoding Reduction Methods for Carrier Aggregation, Valencia, Spain, Jan. 18-22, 2010 (5 pages).

R1-091692 TSG-RAN WG1 #57, NEC Group, PDCCH Structure for LTE-Advanced System, San Francisco, CA. US May 4-8, 2009 (8 pages).

R1-084474 TSG-RAN1 #55, Nortel Networks, Support of Wider Bandwidth for LTE-Advanced, Prague, Czech, Nov. 10-14, 2008 (10 pages).

EPO Search Report for EP patent application 11795203 dated Dec. 18, 2013 (14 pages).

R1-103187 3GPP TSG RAN WG1 Meeting #61, Motorola, LTE-A Dynamic Aperiodic SRS-Triggering Duration Timing and Carrier Aggregation, Montreal, Canada, May 10-14, 2010 (4 pages).

R1-100860 TSG-RAN WG1 #60, Ericsson et al., Further Discussions on SRS Enhancements, San Francisco, USA, Feb. 22-26, 2010 (3 pages).

R1-101189 3GPP TSG RAN WG1 #60, Samsung, SRS Enhancements in Rel-10, San Francisco, USA, Feb. 22-26, 2010 (4 pages).

R1-110227 3GPP TSG RAN WG1 Meeting #63bis, Alcatel-Lucent Shanghai Bell et al., Remaining Issues on Aperiodic SRS, Dublin, Ireland, Jan. 17-21, 2011 (6 pages).

JPO Office Action for JP patent application 2013-536994 dated Mar. 18, 2014 (4 pages).

R1-102966, 3GPP TSG RAN WG1 Meeting #61, Nokia Siemens Networks, Nokia, Dynamic aperiodic SRS, Montreal, Canada, May 10-14, 2010 (2 pages).

R1-105439, 3GPP TSG WG1 Meeting #62bis, NTT DoCoMo, Views on Signaling for Dynamic Aperiodic SRS, Xian, China, Oct. 11-15. 2010 (7 pages).

R1-105633, 3GPP TSG RAN WG1 Meeting #62bis, Motorola, Dynamic Aperiodic sounding and Carrier aggregation, Xi'an, China, Oct. 11-15, 2010 (2 pages).

R1-102765, 3GPP TSG-RAN WG1 #61, Qualcomm Incorporated, Further details on aperiodic dynamic SRS, Montreal, Canada, May 10-14, 2010 (3 pages).

R1-102114, 3GPP TSG RAN1#60bis, Motorola, Aperiodic SRS for LTE-A, Beijing, China, Apr. 12-16, 2010 (2 pages).

R1-105291, 3GPP TSG RAN WG1 #62bis, Texas Instruments, Resource Allocation and Signaling for Aperiodic Sounding, Xian, China, Oct. 11-15, 2010 (4 pages).

The Taiwan IPO has prepared an Office Action for TW patent application 100121171 dated Apr. 8, 2014 (8 pages).

* cited by examiner

SOUNDING MECHANISM AND CONFIGURATION UNDER CARRIER AGGREGATION

CROSS REFERENCE TO RELATED APPLICATIONS

This application is a continuation-in-part of, and claims priority under 35 U.S.C. §120 from nonprovisional U.S. patent application Ser. No. 13/134,811, entitled "Sounding Mechanism under Carrier Aggregation," filed on Jun. 17, 2011, the subject matter of which is incorporated herein by reference. Application Ser. No. 13/134,811, in turn, claims priority under 35 U.S.C. §119 from U.S. Provisional Application No. 61/356,077, entitled "Sounding Operation under Carrier Aggregation Scenarios," filed on Jun. 18, 2010, the subject matter of which is incorporated herein by reference. This application also claims priority under 35 U.S.C. §119 from U.S. Provisional Application No. 61/409,733, entitled "Method of Cell Configuration and Management," filed on Nov. 3, 2010, the subject matter of which is incorporated by reference.

TECHNICAL FIELD

The disclosed embodiments relate generally to wireless network communications, and, more particularly, to sounding channel signaling in LTE-A systems under carrier aggregation.

BACKGROUND

Orthogonal Frequency-Division Multiple Access (OFDMA) is a multi-user version of the Orthogonal Frequency-Division Multiplexing (OFDM) digital modulation technology. In wireless OFDMA systems, however, multipath is an undesirable propagation phenomenon that results in radio signals reaching the receiving antenna by two or more paths. Signal variations in amplitude or phase resulted from multipath are also referred as channel response. Transmission techniques, in which a transmitter makes use of the channel response between the transmitter and a receiver, are called close-loop transmission techniques. In multiple-input multiple-output (MIMO) applications, close-loop transmission techniques are much more robust as compared with open-loop MIMO techniques.

One method of providing channel information to the transmitter is via the use of an uplink (UL) sounding channel. Channel sounding is a signaling mechanism where a mobile station (also referred to as a user equipment (UE)) transmits sounding reference signals (SRS) on an uplink channel to enable a base station (also referred to as an eNodeB) to estimate the UL channel response. Channel sounding assumes the reciprocity of uplink and downlink channels, which is generally true in Time Division Duplexing (TDD) systems. Because the frequency bandwidth of the UL transmission encompasses the frequency bandwidth of the DL transmission in TDD systems, UL channel sounding can enable close-loop SU/MU-MIMO in downlink transmission. For example, the eNodeB can perform non-codebook based downlink beamforming based on channel state information (CSI) measured via SRS. UL channel sounding can also enable UL close-loop MIMO transmission in both TDD and Frequency Division Duplexing (FDD) systems. For example, the eNodeB can perform codebook based uplink beamforming by choosing the best precoding weights (vectors/matrices) (e.g., select the best PMI from the codebook) to be used for the UE based on CSI measured by SRS, such that the UE can perform close-loop SU/MU-MIMO in UL transmission. In TDD system, UL channel sounding can also be used for frequency selective scheduling, where the eNodeB schedules the UE to its best frequency band in both downlink and uplink transmissions.

In 3GPP LTE-Advanced (LTE-A) wireless communication systems, two types of SRS are defined. A first type of Periodic SRS (p-SRS) is used for obtaining long-term channel information. The periodicity of p-SRS is in general long (up to 320 ms) to reduce overhead. The p-SRS parameters are configured by higher layer radio resource control (RRC), so configuration time is long (e.g., 15-20 ms) and signaling flexibility is low. For uplink MIMO supported in Release 10, p-SRS resource is highly demanded for close-loop spatial multiplexing, especially when the number of UEs becomes large. A second type of Aperiodic SRS (ap-SRS) is a new feature introduced in Release 10. Ap-SRS is triggered either by downlink or uplink grant via physical downlink control channel (PDCCH). Once triggered, the UE transmits a sounding sequence in a pre-defined location for one-time transmission. Ap-SRS supports multi-antenna sounding for uplink MIMO. Ap-SRS is much more flexible than p-SRS. Ap-SRS can use residual resource that is not used by p-SRS by multiplexing between ap-SRS and p-SRS.

Carrier aggregation (CA) is introduced as part of the overall 4G enhancement in 3GPP LTE-A systems. With carrier aggregation, an LTE-A system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger aggregated system bandwidth, and provides backward compatibility by allowing legacy users to access the system by using one of the component carriers. Under carrier aggregation, each UE has one primary carrier (i.e., Pcell) and multiple secondary carriers (i.e., Scell). In cross-carrier scheduling scenario, PDCCH is received via Pcell only. Channel sounding, however, shall be configured in both Pcell and Scell. How to apply PDCCH in Pcell to trigger ap-SRS in Scell is a problem faced in LTE-A sounding under carrier aggregation.

SUMMARY

Sounding mechanism for LTE-A systems under carrier aggregation is provided. A user equipment (UE) receives an uplink or downlink grant transmitted from a base station (eNB) over a primary carrier in a multi-carrier LTE-A system. The UE determines indicated carrier(s) and detects a triggering condition for aperiodic sounding transmission in the uplink or downlink grant. The uplink or downlink grant is transmitted via a Physical Downlink Control Channel (PDCCH). The UE then selects UE-specific sounding reference signal (SRS) parameters if the triggering condition is true. The UE-specific SRS parameters are configured via upper layer radio resource control (RRC) signaling. Finally, the UE transmits an aperiodic SRS (ap-SRS) over the indicated carrier(s) using the selected UE-specific SRS parameters.

In one embodiment, the uplink grant is transmitted via a PDCCH carrying DCI format 0 or 4, and downlink grant is transmitted via a PDCCH carrying DCI format 1A, 2B, or 2C. Each DCI format contains a carrier indicator field (CIF) if cross-carrier scheduling is enabled. The CIF is used for scheduling PUSCH transmission or PDSCH reception. In one novel aspect, ap-SRS is transmitted on the carrier indicated by the CIF to achieve cross-carrier scheduling.

In another embodiment, DCI format 3/3A is transmitted via a PDCCH to a group of UEs. DCI format 3/3A contains a plurality of information fields, each field also can be used to indicate if a UE should enable ap-SRS in a particular carrier. The location of each information field corresponds to an indicated carrier of the UE, while the value of each information field corresponds to a triggering condition. Once triggered, the UE transmits an ap-SRS over the indicated one or more carriers. Multiple carriers may be indicated in the same PDCCH.

In one advantageous aspect, multi-set RRC signaling for ap-SRS configuration is provided to enhance ap-SRS flexibility. An eNB transmits a plurality of sets of UE-specific SRS parameters to a UE via upper layer messaging in a multi-carrier wireless communication system. The eNB also determines triggering information of a selected set of UE-specific SRS parameters and an indicated carrier for the UE. The eNB then transmits an uplink or downlink grant over a primary carrier, the grant comprises triggering information for the UE to send an ap-SRS over the indicated carrier using the selected set of UE-specific SRS parameters. In one embodiment of joint signaling, the plurality of sets of UE-specific SRS parameters are signaled together in a single RRC transmission. In another embodiment of separate signaling, each set of UE-specific SRS parameters is signaled independently. Joint signaling is simple at the cost of large signaling overhead, while separate signaling is more flexible but needs to indicate which set is reconfigured.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
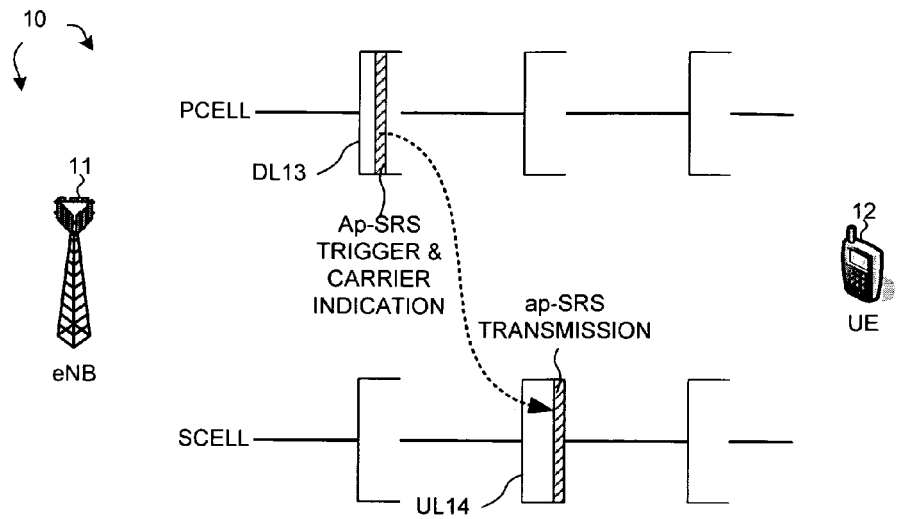
FIG. 1 illustrates uplink channel sounding in multi-carrier wireless communication systems in accordance with one novel aspect.

FIG. 1 illustrates uplink channel sounding in a multi-carrier 3GPP LTE-A wireless communication system 10 in accordance with one novel aspect. In LTE wireless communication systems, a base station (also referred to as an eNB, e.g., eNB11) and a mobile station (also referred to as a user equipment (UE), e.g., UE12) communicate with each other by sending and receiving data carried in a series of frames. Each frame comprises a number of downlink (DL) subframes for the eNB to transmit data to the UE, and a number of uplink (UL) subframes for the UE to transmit data to the eNB. Uplink channel sounding is a signaling mechanism to facilitate various close-loop transmission techniques such as DL/UL beamforming and frequency selective scheduling. For uplink channel sounding, the eNB configures sounding reference signal (SRS) parameters and allocates SRS resource in a previous DL subframe (e.g., subframe DL13), and the UE transmits a sounding signal in a subsequent UL subframe (e.g., DL14) to enable the eNB to estimate UL channel response.

In 3GPP LTE-A systems, two types of SRS are defined for uplink channel sounding. A first type of Periodic SRS (p-SRS) is used for obtaining long-term channel response information. The periodicity of p-SRS is in general long (up to 320 ms). The p-SRS parameters are configured and triggered by higher layer radio resource control (RRC), so configuration time is long (e.g., 15-20 ms delay) and signaling flexibility is low. A second type of Aperiodic SRS (ap-SRS) is also configured via RRC. Ap-SRS, however, is dynamically triggered by an uplink or downlink grant from the eNB. Once triggered, the UE transmits a sounding signal to the eNB in a pre-defined location. Ap-SRS is a new feature introduced in Release 10 that supports multi-antenna sounding for uplink MIMO. Ap-SRS is much more flexible than p-SRS and can use residual resource that is not used by p-SRS by multiplexing between ap-SRS and p-SRS.

Traditionally, p-SRS parameters are configured via RRC. To dynamically trigger and configure ap-SRS parameters, however, the use of higher layer RRC is no longer efficient because of the long latency. Therefore, a faster physical layer signaling method is desirable for triggering ap-SRS and configuring ap-SRS parameters. In one example, ap-SRS may be triggered via a physical downlink control channel (PDCCH) that provides reasonable flexibility. In multi-carrier LTE-A systems with carrier aggregation, each UE has one primary carrier (i.e., Pcell) and multiple secondary carriers (i.e., Scell). In cross-carrier scheduling scenario, PDCCH is received via Pcell only. Uplink channel sounding, however, shall be configured in both Pcell and Scell.

In one novel aspect, an example of uplink channel sounding using ap-SRS with cross-carrier scheduling is illustrated in FIG. 1. Base station eNB11 transmits ap-SRS triggering information in an uplink grant over a primary carrier (e.g., PCELL) in a previous downlink subframe DL13. Based on the ap-SRS triggering information, UE12 detects a triggering condition and carrier indication information in the uplink grant. If the triggering condition is true, then the UE selects the latest RRC configured UE-specific ap-SRS parameters, indicated by PDCCH. Finally, UE12 transmits an ap-SRS over an indicated carrier (e.g., SCELL) in a subsequent uplink subframe UL14 by following the selected UE-specific ap-SRS parameters.

Figure 2:
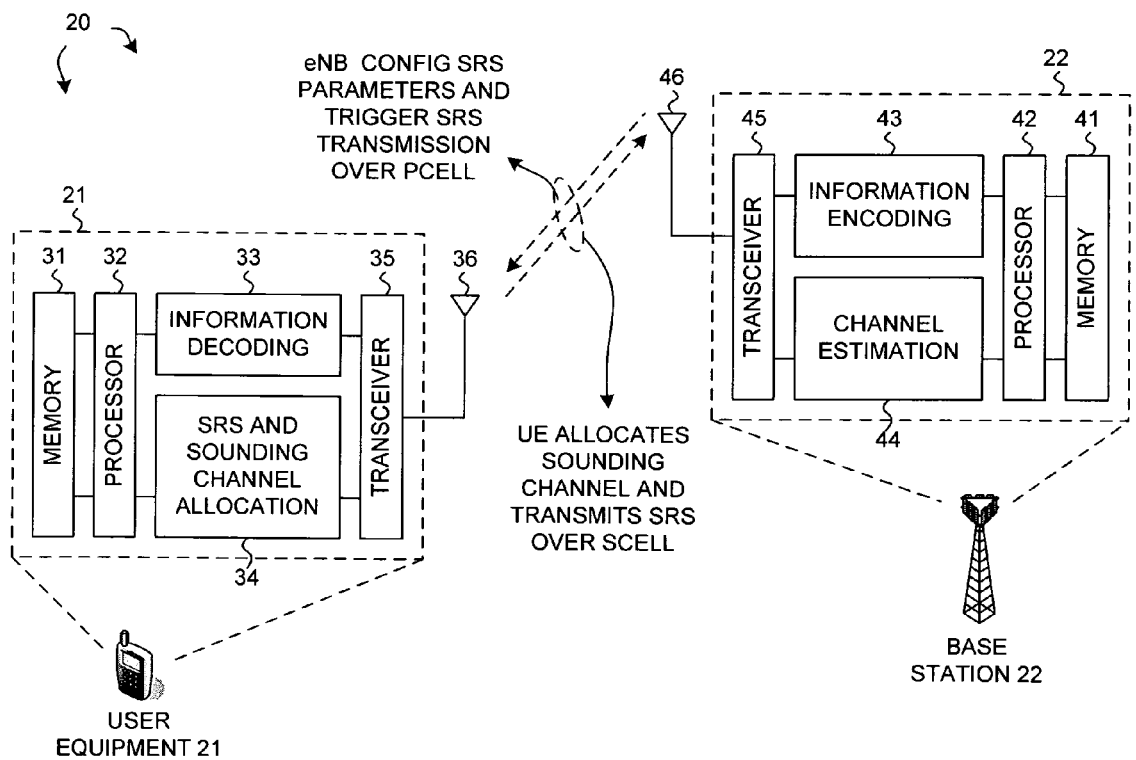
FIG. 2 illustrates a multi-carrier LTE-A wireless communication system with uplink channel sounding in accordance with one novel aspect.

FIG. 2 illustrates a multi-carrier 3GPP LTE-A wireless communication system 20 with uplink channel sounding in accordance with one novel aspect. LTE-A system 20 comprises a user equipment UE21 and a base station eNB22. UE21 comprises memory 31, a processor 32, an information-decoding module 33, an SRS and sounding channel allocation module 34, and a transceiver 35 coupled to an antenna 36. Similarly, eNB22 comprises memory 41, a processor 42, an information-encoding module 43, a channel estimation module 44, and a transceiver 45 coupled to an antenna 46.

For multi-carrier uplink channel sounding, eNB22 configures SRS parameters and allocating SRS resource by transmitting encoded signaling information to UE21 in a DL subframe over a primary carrier (e.g., PCELL). Based on the signaling information, UE21 decodes the SRS parameters and transmits a sounding signal via an allocated sounding channel in a UL subframe back to eNB22 over an indicated secondary carrier (e.g., SCELL) for uplink channel estimation. In one or more exemplary embodiments, the functions described in the uplink sounding procedure may be implemented in hardware, software, firmware, or any combination thereof by the different modules. The functions described above may be implemented together in the same module, or implemented independently in separate modules. For example, at the eNB side, information-encoding module 43 prepares an uplink grant with carrier indication information and ap-SRS triggering information, and transceiver 45 transmits the uplink grant to UE21 over PCELL. At the UE side, information-decoding module 33 detects the carrier indication information and the ap-SRS triggering information, SRS and sounding channel allocation module 34 maps an ap-SRS in an allocated sounding channel, and transceiver 35 transmits the ap-SRS back to UE22 over the indicated carrier (e.g., SCELL). Finally, at the eNB side, transceiver 45 receives the ap-SRS, and channel estimation module 44 estimates uplink channel response based on the received ap-SRS.

Figure 3:
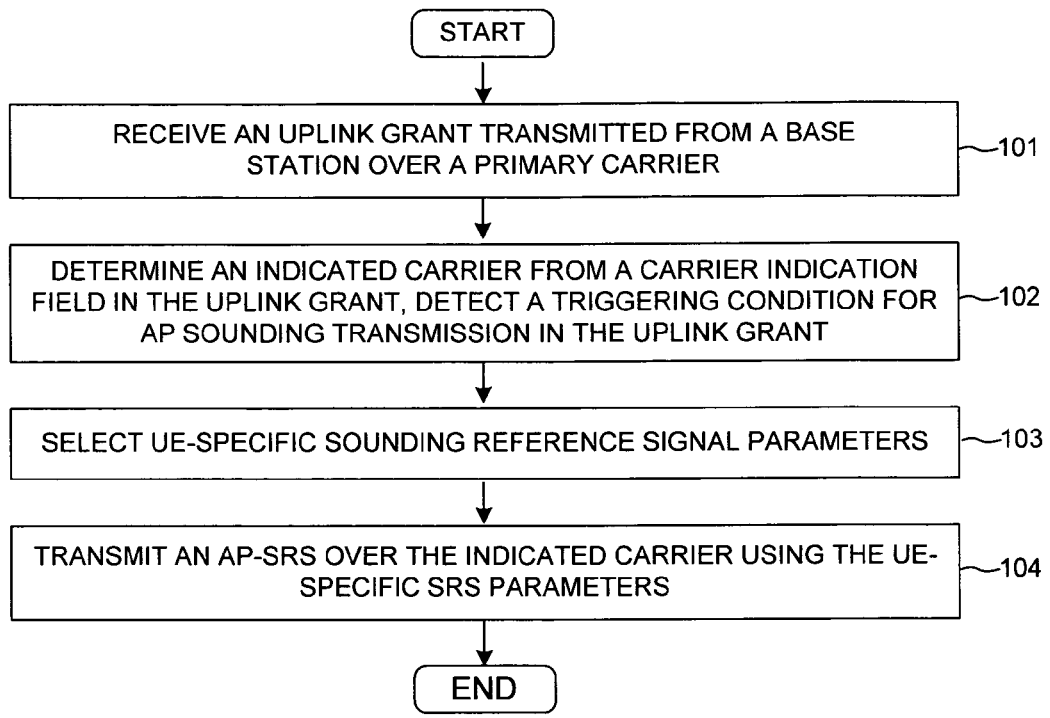
FIG. 3 is a flow chart of a first method of uplink ap-SRS transmission in accordance with one novel aspect.

FIG. 3 is a flow chart of a first method of uplink ap-SRS transmission in a multi-carrier LTE-A system in accordance with one novel aspect. The multi-carrier LTE-A system comprises an eNB and a UE. The eNB and the UE are connected over multiple radio frequency carriers including a primary RF carrier (e.g., PCELL over PCC) and one or more secondary RF carriers (e.g., SCELLs over SCCs). In step 101, the UE receives an uplink or downlink grant transmitted from the eNB over PCELL. In step 102, the UE determines an indicated carrier (e.g., one of the SCELLs) from a carrier information field (CIF) in the grant and detects a triggering condition for ap-SRS transmission in the grant. If the triggering condition is true, then the UE select the latest UE-specific RRC messages based on the value of CIF (step 103). Finally, the UE transmits an ap-SRS over the indicated carrier using the selected UE-specific SRS parameters (step 104). The first method of uplink ap-SRS triggering mechanism is also referred to as "UE-specific triggering".

Figure 4:
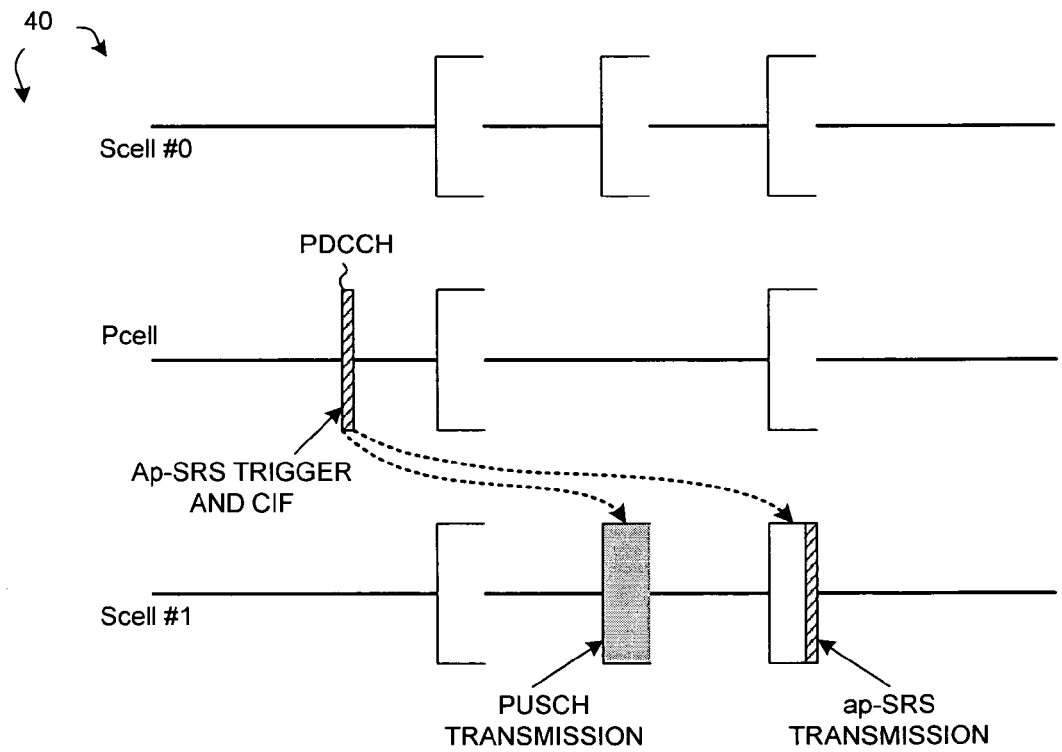
FIG. 4 illustrates one embodiment of the first method of uplink ap-SRS triggering mechanism.

FIG. 4 illustrates one embodiment of the first "UE-specific triggering" method of uplink ap-SRS transmission mechanism in a multi-carrier LTE-A system 40. Multi-carrier LTE-A system 40 comprises an eNB and a UE. The eNB and the UE are connected over multiple RF carriers including a primary carrier (e.g., PCELL) and two secondary carriers (e.g., SCELL #0 and SCELL #1). The eNB transmits an uplink or downlink grant via a PDCCH. The PDCCH supports various downlink control information (DCI) formats. In each DCI format, there is an information field, which is called a "carrier indicator" (CIF). Typically, the "carrier indicator" indicates which carrier should use this uplink grant to do physical uplink share channel (PUSCH) data transmission or physical downlink shared channel (PDSCH) data reception. In one novel aspect, ap-SRS is transmitted over the carrier used for PUSCH transmission, which is the carrier indicated by CIF. In the example of FIG. 4, the value of CIF in the uplink grant indicates carrier SCELL #1 (e.g., CIF="#1"). As a result, PUSCH transmission is scheduled over SCELL #1 based on the uplink grant (e.g., depicted as a grey-shaded area). In addition, ap-SRS transmission is also triggered over the same carrier SCELL #1 based on the same uplink grant (e.g., depicted as a slash-shaded area).

Figure 5:
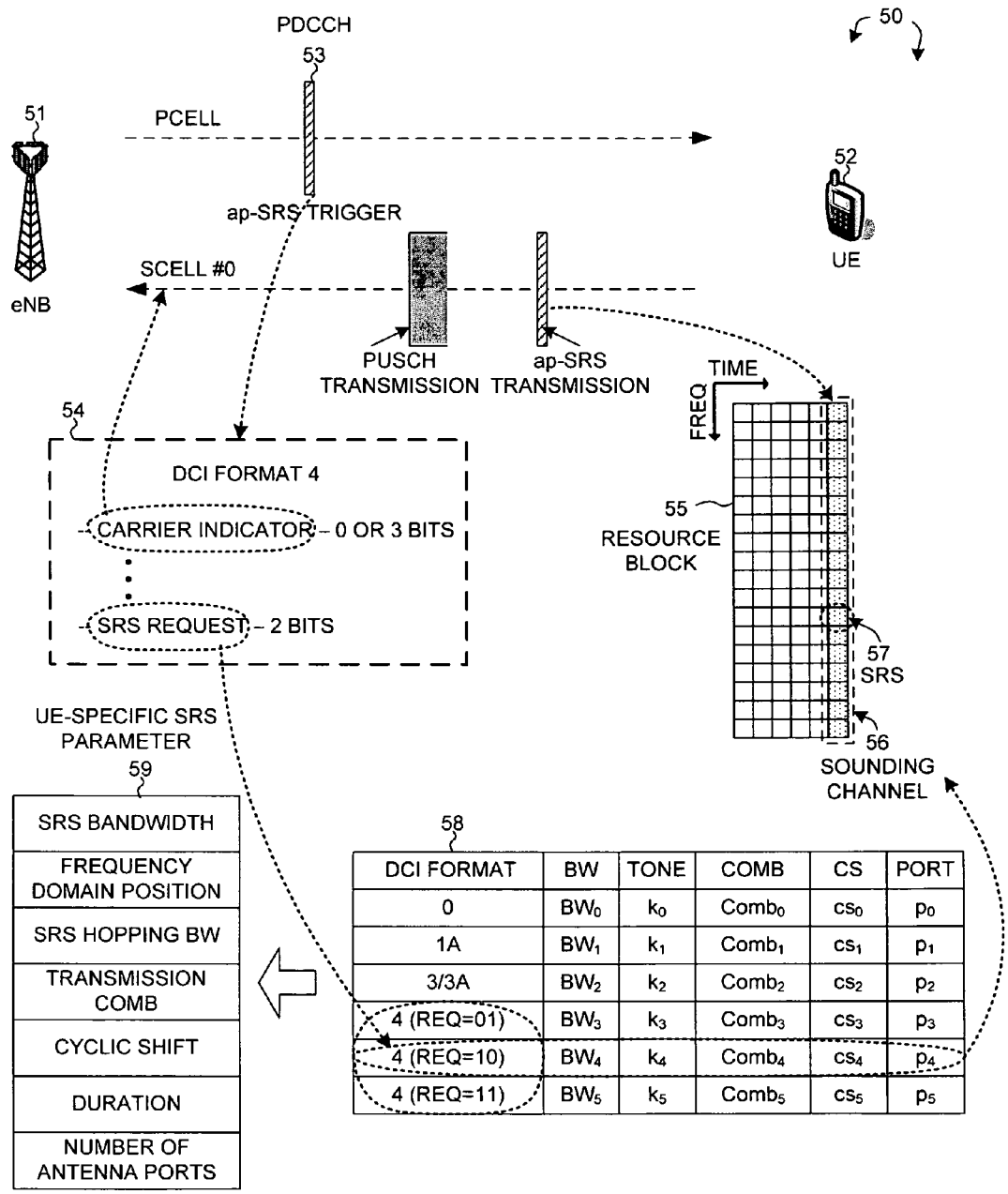
FIG. 5 illustrates a detailed example of the first method of uplink ap-SRS transmission.

FIG. 5 illustrates a detailed example of the first "UE-specific triggering" method of uplink ap-SRS transmission in a multi-carrier LTE-A system 50. Multi-carrier LTE-A system comprises an eNB 51 and a UE52, connected with each other over a primary RF carrier PCELL and a secondary RF carrier SCELL #0. To trigger ap-SRS transmission, eNB 51 transmits an uplink grant via a PDCCH 53. In the example of FIG. 5, PDCCH 53 supports DCI Format 4 as illustrated in block 54. DCI format 4 contains a "carrier indicator" field (CIF) that is 0 or 3 bits long. The CIF is "#0" in format 4, and thus indicates the secondary carrier SCELL #0. Upon receiving the uplink grant, UE52 performs PUSCH transmission over SCELL #0 accordingly. In addition, UE52 also detects any triggering condition in the uplink grant and thereby determining whether to trigger ap-SRS transmission over SCELL #0. If the triggering condition is true, then UE52 selects the latest UE-specific RRC messages based on the value of CIF and transmits ap-SRS over SCELL #0 with the selected UE-specific parameters.

In 3GPP LTE-A systems, for configuring p-SRS or ap-SRS parameters, two types of SRS parameters are defined in 3GPP LTE-A systems for each component carrier. A first type of cell-specific parameters includes SRS bandwidth configuration and SRS subframe configuration. The cell-specific parameters are used to define the overall SRS resource allocated in a cell served by an eNB. A second type of UE-specific parameters (e.g., illustrated by table 59 in FIG. 5) includes SRS bandwidth allocation, SRS hopping bandwidth, frequency domain position, SRS duration, number of antenna ports, transmission comb, and cyclic shift (CS). The UE-specific parameters are used to define SRS resource allocation for each individual UE. The cell-specific parameters for p-SRS are re-used for ap-SRS because p-SRS and ap-SRS share the overall SRS resource. The UE-specific parameters for ap-SRS, however, are different from p-SRS such that ap-SRS can use residual resource that is not used by p-SRS by multiplexing between ap-SRS and p-SRS for each UE. Because cell-specific SRS parameters of p-SRS can be re-used for ap-SRS, only UE-specific parameters need to be selected for ap-SRS transmission.

Because UE-specific SRS parameters are configured via an upper layer RRC signaling, configuration time is long and signaling flexibility is low. To facilitate efficient SRS configuration, each DCI format is associated with one or more predefined sets of UE-specific SRS parameters. As illustrated by table 58 in FIG. 5, DCI Format 0, and Format 3/3A, each is associated with one set of UE-specific SRS parameters. For example, if DCI format 0 is used in an uplink grant via PDCCH 53, then a predefined SRS parameter set with SRS Bandwidth=BW0, frequency domain position=k0, transmission comb=comb0, cyclic shift=cs0, and antenna port=p0 is selected. Similarly, if DCI format 1A is used in an downlink grant via PDCCH 53, then a predefined SRS parameter set with SRS Bandwidth=BW1, frequency domain position=k1, transmission comb=comb1, cyclic shift=cs1, and antenna port=p1 is selected.

On the other hand, DCI format 4 is associated with three sets of UE-specific SRS parameters. FIG. 5 illustrates an example of DCI format 4 with an SRS request having two signaling bits. In the example of FIG. 5, eNB51 uses the two signaling bits to configure UE-specific ap-SRS parameters for UE52 via PDDCH 53. The two signaling bits can indicate four states, including three states for three sets of parameter combinations plus one state for no triggering of ap-SRS. Each of the three states indicates a predefined parameter combination of SRS bandwidth, frequency domain position, transmission comb, cyclic shift, and antenna port. For example, if SRS request=10, then a predefined SRS parameter set with SRS Bandwidth=BW4, frequency domain position=k4, transmission comb=comb4, cyclic shift=cs4, and antenna port=p4 is selected. UE52 then uses this set of SRS parameters to allocate sounding channel 56 and generate SRS 57 for ap-SRS transmission over the indicated carrier SCELL #0. The actual values of the pre-defined sets of UE-specific parameters can be updated or re-configured via RRC signaling whenever necessary. If SRS request=00, then no ap-SRS transmission is triggered.

Figure 6:
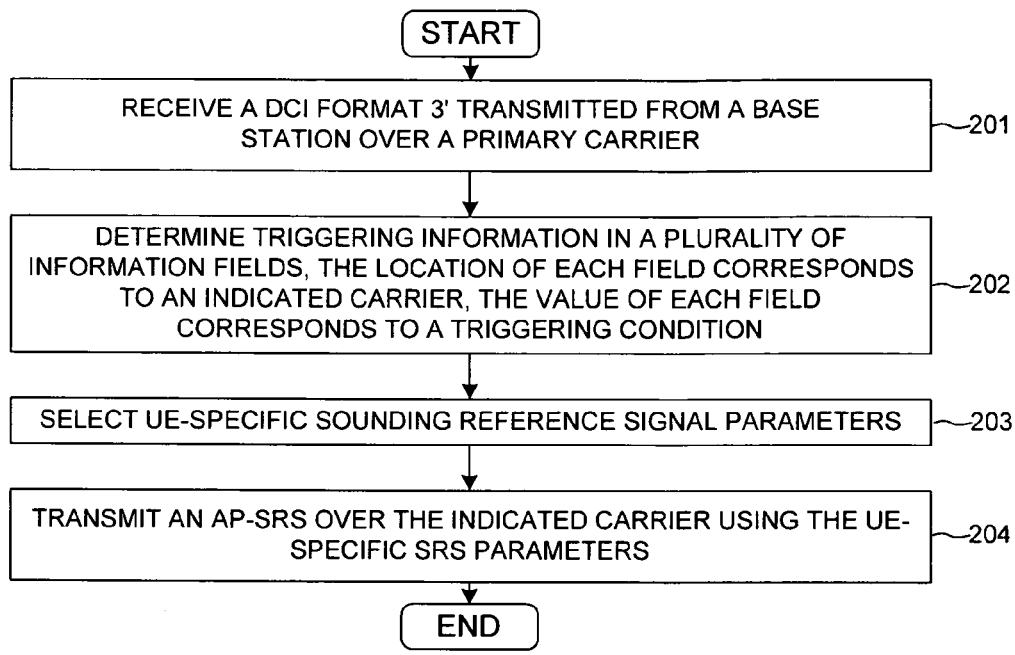
FIG. 6 is a flow chart of a second method of uplink ap-SRS transmission in accordance with one novel aspect.

FIG. 6 is a flow chart of a second method of uplink ap-SRS transmission in a multi-carrier LTE-A system in accordance with one novel aspect. The multi-carrier LTE-A system comprises an eNB and a UE. The eNB and the UE are connected over multiple radio frequency carriers including a primary RF carrier (e.g., PCELL over PCC) and one or more secondary RF carriers (e.g., SCELLs over SCCs). In step 201, the UE receives a DCI format 3/3A transmitted from the eNB in PCELL over PCC. In step 202, the UE determines triggering information in a plurality of information fields in the DCI format. The location of each information field corresponds to an indicated carrier of the UE, while the value of each information field corresponds to a triggering condition. If at least one of the triggering conditions is true, then the UE selects the latest configured UE-specific SRS parameters (step 203). Finally, the UE transmits an ap-SRS over the indicated carrier using the selected UE-specific SRS parameters (step 204). Because a group of UEs may be triggered for uplink ap-SRS transmission via the same DCI format, the second method of uplink ap-SRS triggering mechanism is also referred to as "group-wise triggering".

Figure 7:
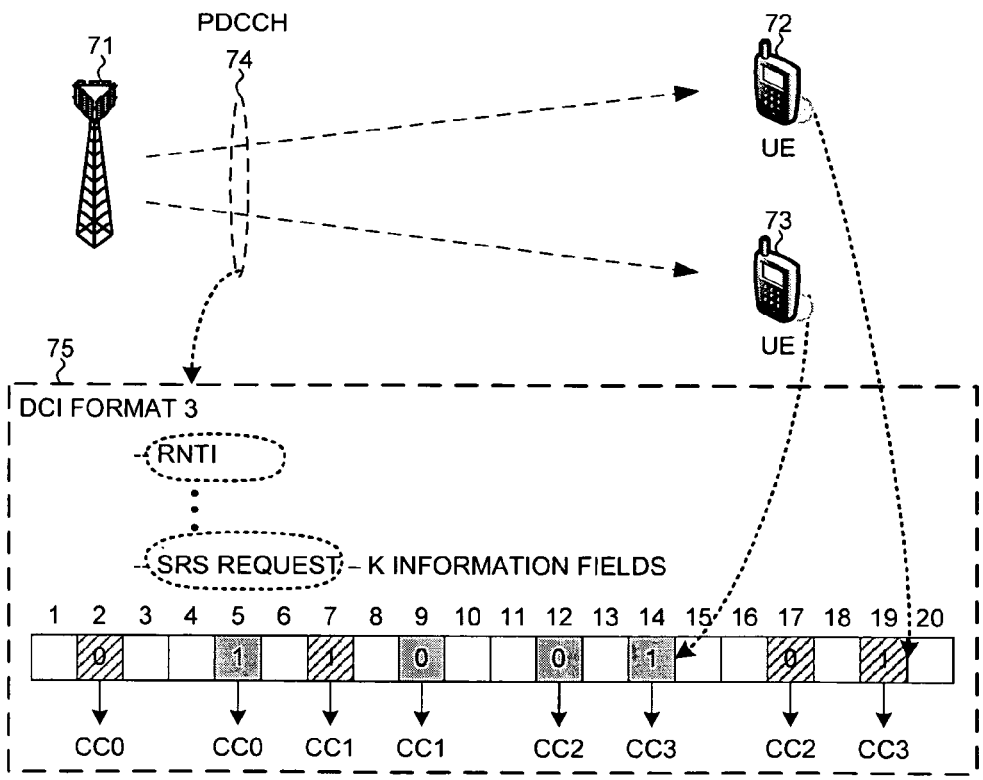
FIG. 7 illustrates one embodiment of the second method of uplink ap-SRS triggering mechanism.

FIG. 7 illustrates one embodiment of the second "group-wise triggering" method of uplink ap-SRS transmission mechanism in a multi-carrier LTE-A system 70. Multi-carrier LTE-A system comprises an eNB71, UE72, and UE73. Base station eNB71 and UE72, UE73 supports four component carriers CC0, CC1, CC2, and CC3. Suppose CC0 is the primary component carrier PCC, and the other three carriers are the SCCs. In a DL subframe, eNB71 broadcasts a PDCCH 74 to UE72 and UE73 over the primary carrier CC0. PDCCH 74 has a DCI Format 3/3A. DCI Format 3 is used for the transmission of the Transmit Power Control (TPC) commands for Physical Uplink Control Channel (PUCCH) and PUSCH with 2-bit power adjustments. Similarly, DCI Format 3A is used for the transmission of the Transmit Power Control (TPC) commands for PUCCH and PUSCH with 1-bit power adjustments.

In one novel aspect, a new DCI format similar to DCI format 3/3A is used to do group triggering of uplink ap-SRS transmission over multiple carriers. To avoid confusion, the new DCI format is referred to as DCI format 3'. DCI format 3' contains K information fields, and each field contains M bits. Additional x padding bits can be added so that the total number of bits in format 3' is equal to that of DCI format 3/3A. DCI Format 3' is sent to a group of UEs via broadcasting one PDCCH. Different UE groups can be differentiated by different Radio Network Temporary Identifier (RNTI) sequence. Within each UE group, each UE can be assigned N fields among the K information field. For each UE, each field indicates if the UE should enable ap-SRS in a specific carrier or not.

In the example of FIG. 7, block 75 illustrates one example of DCI format 3' in PDCCH 74. In this particular example, the SRS request contains total 20 information fields, each field contains one bit, and each UE is assigned with four fields (e.g., K=20, M=1, and N=4). UE72 is assigned with four information fields depicted by slashed shade, and UE73 is assigned with four information fields depicted by grey shade. Within each UE, each field indicates if the UE should enable ap-SRS in a particular carrier or not. In other words, the location of each field corresponds to a particular carrier, and the value of each field corresponds to whether ap-SRS is triggered or not. For UE72, fields 2, 7, 17, and 20 correspond to CC0, CC1, CC2, and CC3, respectively. In addition, because the value of each of those fields equals to 0, 1, 0, and 1, it indicates that ap-SRS is triggered for CC1 and CC3, but not for CC0 and CC2. Similarly, for UE73, fields 5, 9, 12, and 14 correspond to CC0, CC1, CC2, and CC3, respectively. In addition, because the value of each of those fields equals to 1, 0, 0, and 1, it indicates that ap-SRS is triggered for CC0 and CC3, but not for CC1 and CC2.

Once the UE determines that ap-SRS is triggered for one or more carriers, the UE selects SRS parameters and transmits ap-SRS signals over the indicated carrier(s). For example, UE72 transmits sp-SRS signals over CC1 and CC3, and UE73 transmits ap-SRS signals over CC0 and CC3 with selected SRS-parameters. For group triggering, cell-specific and UE-specific ap-SRS parameters of each carrier are also configured from RRC. Referring back to FIG. 5, for DCI Format 3/3A, a predefined SRS parameter set with SRS Bandwidth=BW2, frequency domain position=k2, transmission comb=comb2, cyclic shift=cs2, and antenna port=p2 is selected.

In addition to SRS parameter configuration, the eNB utilizes RRC signaling to configure each UE the following parameters for group triggering: the RNTI sequence which should be monitored for group triggering, the index of SRS triggering signal in a group (e.g., the number and location of the information fields that belong to each UE), and the corresponding carrier indexes for each UE.

In 3GPP LTE-A systems, both cell-specific SRS parameters and UE-specific SRS parameters need to be configured for p-SRS and ap-SRS. The cell-specific parameters for p-SRS are re-used for ap-SRS because p-SRS and ap-SRS share the overall SRS resource. The UE-specific parameters for ap-SRS, however, are different from p-SRS such that ap-SRS can use residual resource that is not used by p-SRS by multiplexing between ap-SRS and p-SRS for each UE. Conventionally, there is only one set of UE-specific SRS parameters for p-SRS, and the parameters are configured via RRC signaling when they need to be modified. However, configuration time via upper layer messaging is long and signaling flexibility is low if the same signaling method is re-used for ap-SRS. This is especially true for multi-carrier systems, where multiple sets of ap-SRS parameters are supported in each carrier. To facilitate efficient SRS configuration, each DCI format is associated with one or more pre-defined sets of UE-specific SRS parameters. Referring back to table 58 in FIG. 5, for example, DCI Format 0/3/3A each is associated with one set of UE-specific SRS parameters, and DCI Format 4 is associated with three sets of UE-specific SRS parameters. DCI Format 4 supports uplink MIMO and requires more flexibility of ap-SRS configuration.

In one novel aspect, multi-set RRC signaling is used to configure UE-specific SRS parameters for ap-SRS. Multiple sets of RRC parameters are pre-defined for each UE to signal UE-specific SRS parameters, and each parameter set contains a subset of the UE-specific parameters including: SRS bandwidth allocation, SRS hopping bandwidth, frequency domain position, SRS duration, number of antenna ports, transmission comb, and cyclic shift (CS). Two signaling methods may be used: a joint signaling method and a separate signaling method. In a joint signaling method, multiple sets of UE-specific SRS parameters are signaled together in a single RRC message transmission. Joint signaling provides simplicity and flexibility for ap-SRS at the cost of RRC signaling overhead. In a separate signaling method, each set of UE-specific SRS parameters is signaled independently. If one set of parameters needs to be re-configured, then that set of parameters is signaled via RRC without the need to signal other sets of parameters. This provides enhanced signaling flexibility with reduced signaling overhead, especially if the number of sets is large. However, if the reconfiguration does not happen frequently, joint signaling is better. Moreover, A new information element (IE) (e.g., setNumber), is required to indicate which set is re-configured, for separate signaling method.

Figure 8:
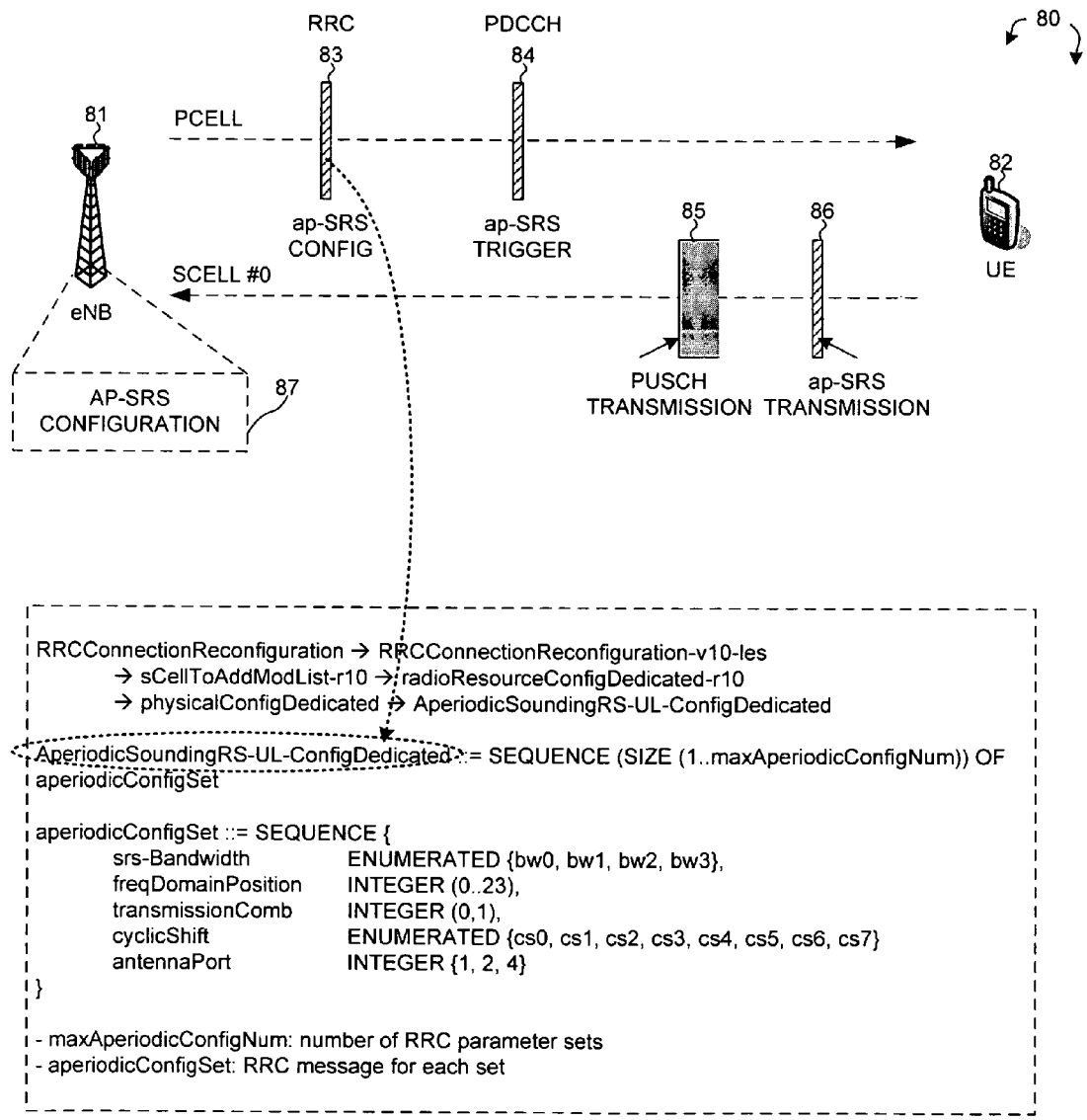
FIG. 8 illustrates one embodiment of multi-set RRC signaling for ap-SRS in accordance with one novel aspect.

FIG. 8 illustrates a method of joint signaling of multiple sets of UE-specific SRS parameters via RRC in a multi-carrier LTE-A system 80. Multi-carrier LTE-A system comprises an eNB81 and a UE82, connected with each other over a primary RF carrier PCELL and a secondary RF carrier SCELL #0. To configure UE-specific SRS parameters, eNB81 transmits all sets of ap-SRS parameters together via a single RRC message 83. As illustrated in FIG. 8, the SRS parameters are configured (e.g., by ap-SRS configuration module 87) as part of physical parameters (i.e., AperiodicSoundingRS-UL-ConfigDedicated) of the RRC message RRCConnectionReconfiguration. The secondary cell (Scell) index is given in sCellToAddModList-r10. A single RRC message can configure or modify ap-SRS parameters for multiple Scells simultaneously. Two RRC formats may be used for the joint signaling. The content of RRC message can be encoded by direct signaling or delta signaling method. For direct signaling method, each parameter of each set is signaled directly without any further processing. For delta signaling method, some parameters are signaled in a "differential" way. For example, a reference point is chosen, and the differential value between the reference point and each parameter is signaled to save signaling overhead. In one novel aspect, the Pcell is the reference point.

In the example of FIG. 8, direct signaling method is used, where each parameter of each set of UE-specific parameters is signaled directly without any further processing. For example, the physical parameters of AperiodicSoundingRS-UL-ConfigDedicated include a sequence of aperiodicConfig-Set. The maximum number of RRC parameter sets is maxAperiodicConfigNum, and each aperiodicConfigSet contains the values of a subset of UE-specific parameters including SRS bandwidth, frequency domain position, transmission comb, cyclic shift, and number of antenna port. The exact value of each parameter for each set is directly signaled via RRC message 83.

To trigger ap-SRS transmission, eNB81 transmits an uplink grant via a PDCCH 84. For example, PDCCH 84 supports DCI Format 4 and contains a "carrier indicator" field (CIF) "#0" indicating the secondary carrier SCELL #0. Upon receiving the uplink grant, UE82 performs PUSCH transmission 85 over SCELL #0 accordingly. In addition, UE82 also detects any triggering condition in the uplink grant and thereby determining whether to trigger ap-SRS transmission over SCELL #0. If the triggering condition is true, then UE82 selects the latest UE-specific SRS parameters configured by RRC message 83 based on the value of CIF and transmits ap-SRS 86 over SCELL #0 with the selected UE-specific parameters.

Figure 9:
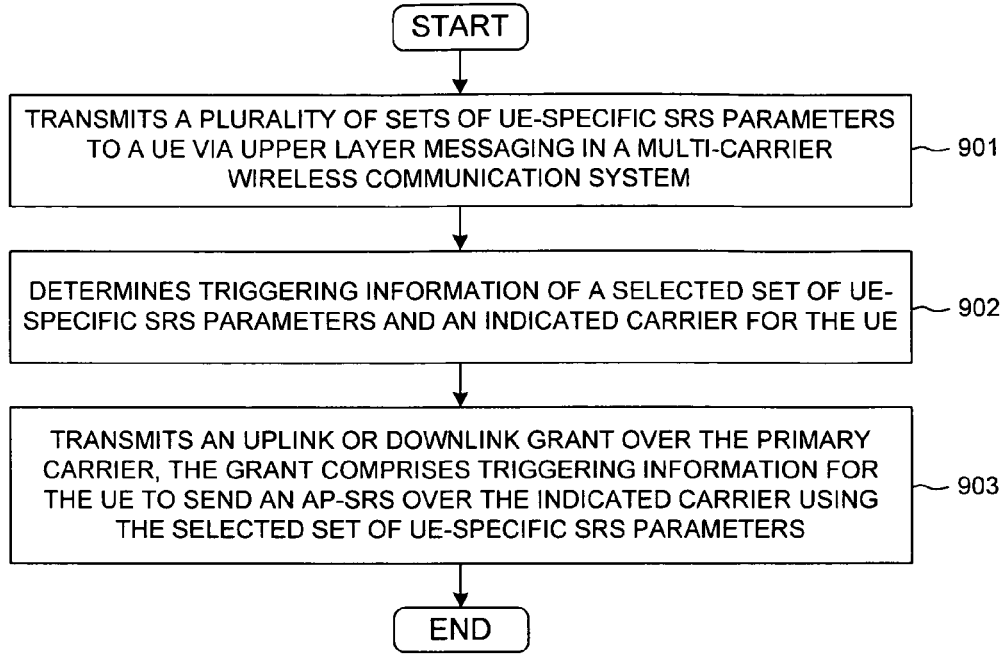
FIGS. 9 and 10 are flow charts of a method of multi-set RRC signaling for ap-SRS configuration.

FIG. 9 is a flow chart of a method of multi-set RRC signaling for ap-SRS configuration from eNB perspective. In step 901, an eNB transmits a plurality of sets of UE-specific SRS parameters to a UE via upper layer messaging in a multi-carrier wireless communication system. In step 902, the eNB determines triggering information of a selected set of UE-specific SRS parameters and an indicated carrier for the UE. In step 903, the eNB transmits an uplink or downlink grant over a primary carrier, the grant comprises triggering information for the UE to send an ap-SRS over the indicated carrier using the selected set of UE-specific SRS parameters. In one embodiment of joint signaling, the plurality of sets of UE-specific SRS parameters are signaled together in a single RRC transmission. In another embodiment of separate signaling, each set of UE-specific SRS parameters is signaled independently.

Figure 10:
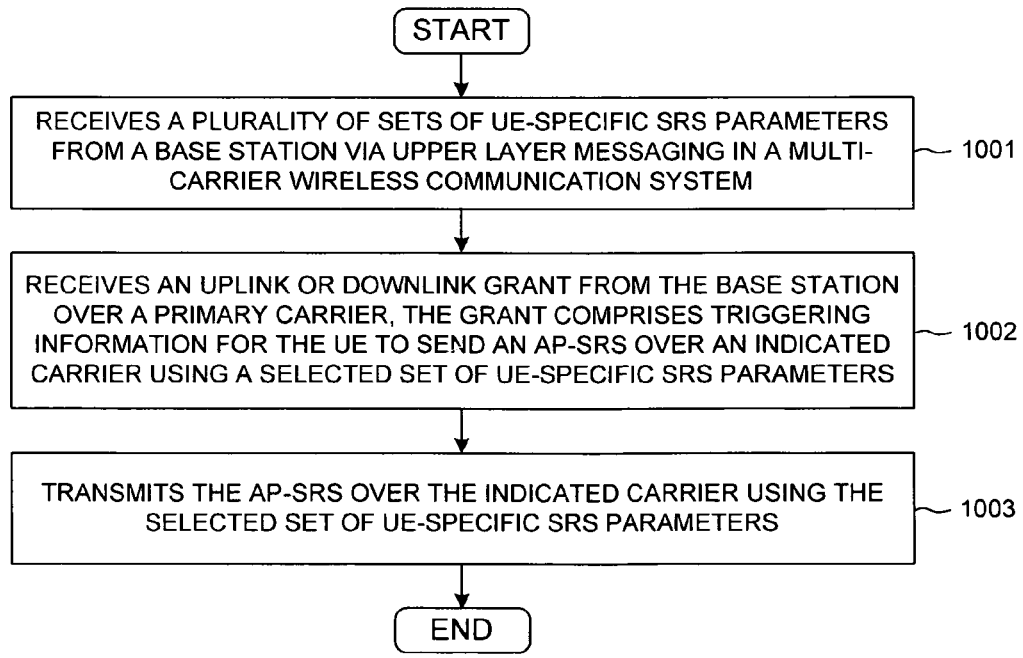

FIG. 10 is a flow chart of a method of multi-set RRC signaling for ap-SRS configuration from UE perspective. In step 1001, a UE receives a plurality of sets of UE-specific SRS parameters from a base station via upper layer messaging in a multi-carrier wireless communication system. In step 1002, the UE receives an uplink or downlink grant from the base station over a primary carrier, the grant comprises triggering information for the UE to send an ap-SRS over an indicated carrier using a selected set of UE-specific SRS parameters. In step 1003, the UE transmits the ap-SRS over the indicated carrier using the selected set of UE-specific SRS parameters. In one embodiment of joint signaling, the plurality of sets of UE-specific SRS parameters are signaled together in a single RRC transmission. In another embodiment of separate signaling, each set of UE-specific SRS parameters is signaled independently.

In one novel aspect, the multi-carrier system can be deployed as a LTE-A system in conjunction with other wireless communication system, such as WiFi or cognitive radio (CR). In such deployment, Pcell is referred to a carrier in the LTE-A system and Scells are referred to the other communication system.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   transmitting a plurality of sets of UE-specific sounding reference signal (SRS) parameters associated with aperiodic SRS (ap-SRS) transmission over different carriers to a user equipment via upper layer messaging in a multi-carrier wireless communication system, wherein the plurality of sets of UE-specific SRS parameters are jointly signaled together via a single radio resource control (RRC) message;
   determining a selected set of UE-specific SRS parameters and an indicated carrier for the UE; and
   transmitting a grant to the UE over a primary carrier, wherein the grant comprises information for the UE to send an aperiodic SRS (ap-SRS) over the indicated carrier using the selected set of UE-specific SRS parameters, and wherein the grant further comprises a carrier indicator field indicating the indicated carrier.

2. The method of claim 1, wherein each set of UE-specific SRS parameters comprises an SRS bandwidth, a frequency domain position, a transmission comb, a cyclic shift, and a number of antenna ports.

3. The method of claim 1, wherein the plurality of sets of UE-specific SRS parameters are configured as part of physical parameters of the RRC message, and wherein the RRC message configures ap-SRS for multiple secondary carriers.

4. The method of claim 1, wherein the grant is transmitted in a physical downlink control channel (PDCCH) that supports multiple downlink control information (DCI) formats, and wherein each DCI format corresponds to one or more sets of predefined UE-specific SRS parameters configured via upper layer messaging.

5. The method of claim 1, wherein the SRS parameters are transmitted via direct signaling or delta signaling.

6. A base station, comprising:
  an information encoding module that encodes a plurality of sets of UE-specific SRS parameters associated with aperiodic SRS (ap-SRS) transmission over different carriers for a user equipment (UE); and
  a transmitter that transmits the plurality of sets of UE-specific SRS parameters via upper layer messaging over a primary carrier, wherein the plurality of sets of UE-specific SRS parameters are jointly signaled together via a single radio resource control (RRC) message, wherein the transmitter also transmits a grant to the UE over the primary carrier, and wherein the grant comprises triggering information for the UE to send an aperiodic SRS (ap-SRS) over an indicated carrier using a selected set of UE-specific SRS parameters, and wherein the grant further comprises a carrier indicator field indicating the indicated carrier.

7. The base station of claim 6, wherein each set of UE-specific SRS parameters comprises an SRS bandwidth, a frequency domain position, a transmission comb, a cyclic shift, and a number of antenna ports.

8. The base station of claim 6, wherein the plurality of sets of UE-specific SRS parameters are configured as part of physical parameters of the RRC message, and wherein the RRC message configures ap-SRS for multiple secondary carriers.

9. The base station of claim 6, wherein the grant is transmitted in a physical downlink control channel (PDCCH) that supports multiple downlink control information (DCI) formats, and wherein each DCI format corresponds to one or more sets of predefined UE-specific SRS parameters configured via upper layer messaging.

10. The base station of claim 6, wherein the SRS parameters are transmitted via direct signaling or delta signaling.

* * * * *